United States Patent [19]

Haferl

[11] Patent Number: 4,544,864
[45] Date of Patent: Oct. 1, 1985

[54] SWITCHED VERTICAL DEFLECTION CIRCUIT WITH BIDIRECTIONAL POWER SUPPLY

[75] Inventor: Peter E. Haferl, Adliswil, Switzerland

[73] Assignee: RCA Corporation, Princeton, N.J.

[21] Appl. No.: 561,174

[22] Filed: Dec. 14, 1983

[30] Foreign Application Priority Data

Feb. 21, 1983 [GB] United Kingdom ................ 8304755

[51] Int. Cl.[4] .............................................. H01J 29/72
[52] U.S. Cl. ...................................... 315/393; 315/408
[58] Field of Search ................ 315/408, 393, 370, 371

[56] References Cited

U.S. PATENT DOCUMENTS

| 4,115,725 | 9/1978 | Hashimoto | 315/408 |
| 4,234,826 | 11/1980 | Dietz | 315/393 |
| 4,238,712 | 12/1980 | Dietz | 315/393 |
| 4,296,360 | 10/1981 | Rilly | 315/387 |

Primary Examiner—Theodore M. Blum
Attorney, Agent, or Firm—Paul J. Rasmussen; Joseph Laks; Scott J. Stevens

[57] ABSTRACT

A switched vertical deflection circuit derives vertical deflection current from horizontal deflection energy. A single switching element operates during both horizontal trace and retrace intervals. Conduction of the switching element is controlled by a vertical control circuit to provide the desired vertical deflection current. Feedback to the control circuit is referenced to ground potential to eliminate nonlinearity caused by voltage supply variations. The vertical circuit voltage supply is adapted to sink as well as supply current, thereby stabilizing the supply.

7 Claims, 5 Drawing Figures

SWITCHED VERTICAL DEFLECTION CIRCUIT WITH BIDIRECTIONAL POWER SUPPLY

This invention relates to deflection circuits for television receivers and, in particular, to vertical deflection circuits which derive power from horizontal deflection energy.

Synchronous switched vertical deflection circuits operate by storing a portion of the horizontal trace or retrace energy each horizontal deflection cycle. This energy is applied to the vertical deflection winding in order to provide the desired vertical deflection current in the deflection windings. The amount of horizontal rate energy that is stored each horizontal interval is carefully controlled in order to provide the correct amount of vertical deflection current.

U.S. Pat. No. 4,048,544 discloses a switched vertical deflection circuit in which a pair of SCRs are selectively rendered conductive in order to permit portions of positive and negative polarity horizontal retrace pulses to charge a capacitor. The capacitor is connected to the vertical deflection windings and discharges through the winding to provide the desired vertical deflection current. The gating signals for the SCRs are provided by pulse width modulating circuits.

Figure 1:
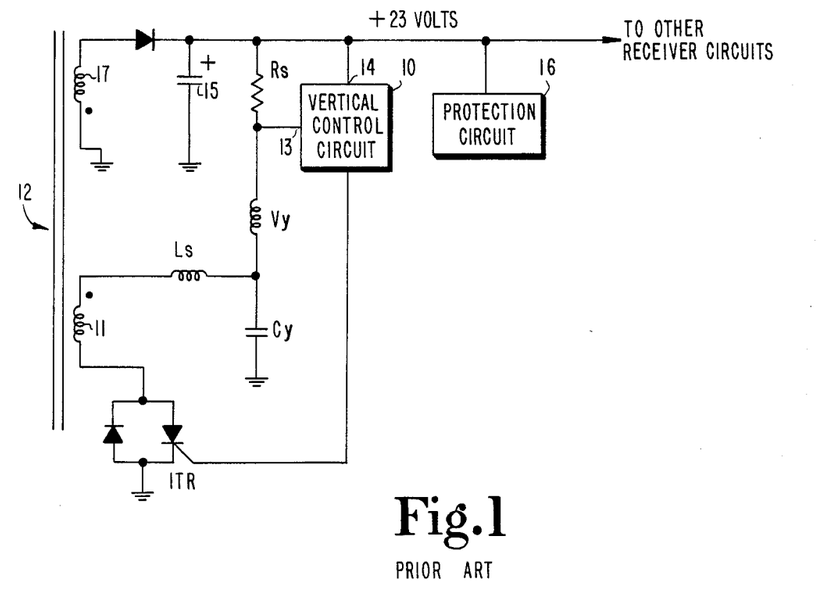
FIG. 1 is a schematic and block diagram of a switched vertical deflection circuit of the prior art.

FIG. 1 illustrates a prior art circuit which utilizes a single switch comprising a thyristor and diode combination, such as an ITR, and a single storage coil $L_s$ to effect horizontal-rate charge and discharge of a storage capacitor $C_y$ which supplies vertical deflection current. In the circuit shown in FIG. 1, the supply capacitor 15 charges through the vertical deflection winding $V_y$. This causes a large amount of vertical parabola voltage to be superimposed on the 23 volt supply. This may disrupt the operation of other receiver circuits operating from the 23 volt supply. Also, if a circuit malfunction should cause the thyristor to fail to turn on, capacitor 15 will charge via the ITR diode to a level greater than the 23 volt power supply, which may damage the vertical control circuit or other receiver circuits. This requires the use of a protection circuit 16 to disable the receiver if the level of the 23 volt supply increases.

The present invention is directed to a switched vertical deflection circuit that advantageously incorporates only one switching element yet provides more economy and greater reliability as compared to the single element switched vertical deflection circuit of FIG. 1.

In accordance with an aspect of the present invention, a vertical deflection circuit for a video display apparatus comprises a vertical deflection winding and a capacitor connected to the vertical deflection winding for providing vertical deflection current to the winding. A source of horizontal deflection rate energy incorporates a switching transistor. A switch applies a predetermined amount of horizontal rate energy to the capacitor during a first portion of each horizontal deflection interval and removes a predetermined amount of energy from the capacitor during a second portion of each horizontal deflection interval. Unidirectional current control means completes a current path from the vertical deflection winding to a source of reference potential by way of the transistor in response to switching of the transistor.

In the accompanying drawing.

The prior art switched vertical deflection circuit shown in FIG. 1 incorporates a single switching element, such as an ITR, which has its conduction controlled by a vertical control circuit 10. During the horizontal retrace interval, current flows from ground, through the diode of the ITR, winding 11 of a high voltage transformer 12, storage coil $L_s$ and charges capacitor $C_y$. The charge on capacitor $C_y$ then causes a deflection current to flow from $C_y$ through the vertical deflection winding $V_y$ and the sampling resistor $R_s$. The voltage developed across sampling resistor $R_s$ is sensed by vertical control circuit 10 which in turn controls the conduction of the SCR element of the ITR.

The SCR is conductive during a portion of the horizontal trace interval. During conduction of the SCR, current flows from the +23 volt supply through deflection winding $V_y$, coil $L_s$, winding 11 and the SCR to ground. Controlling the conduction of the SCR by shifting the occurrence of the SCR trigger pulses during the horizontal trace interval provides the desired sawtooth vertical deflection current in deflection winding $V_y$.

In the prior art circuit of FIG. 1 the voltage across sampling resistor $R_s$ is determined by the deflection winding voltage and the level of the +23 volt supply. The +23 volt supply is generated via a winding 17 of a high voltage transformer 12. Load variations of other receiver circuits may cause variations or modulation of the +23 volt supply via the flyback transformer 12. This may in turn alter the voltage developed across sampling resistor $R_s$, causing nonlinearity distortion in the vertical deflection current. A possible solution would require a common mode rejection input circuit for the feedback input 13 and power input 14 of the vertical control circuit 10, which would compensate for variations in the +23 volt supply level.

Vertical parabola voltage (ripple) developed across the storage capacitor 15 may be superimposed on the +23 volt supply, thereby disrupting the operation of other circuits connected to this supply. Also, in the prior art circuit of FIG. 1, failure of the SCR to trigger causes capacitor 15 to charge to a level much higher than the +23 volt supply via the diode of the SCR. This increased voltage may damage the vertical control circuit or other receiver circuits, thereby necessitating protection circuit 16, which illustratively disables the receiver if the voltage across capacitor 15 increases beyond a predetermined level.

Figure 2:
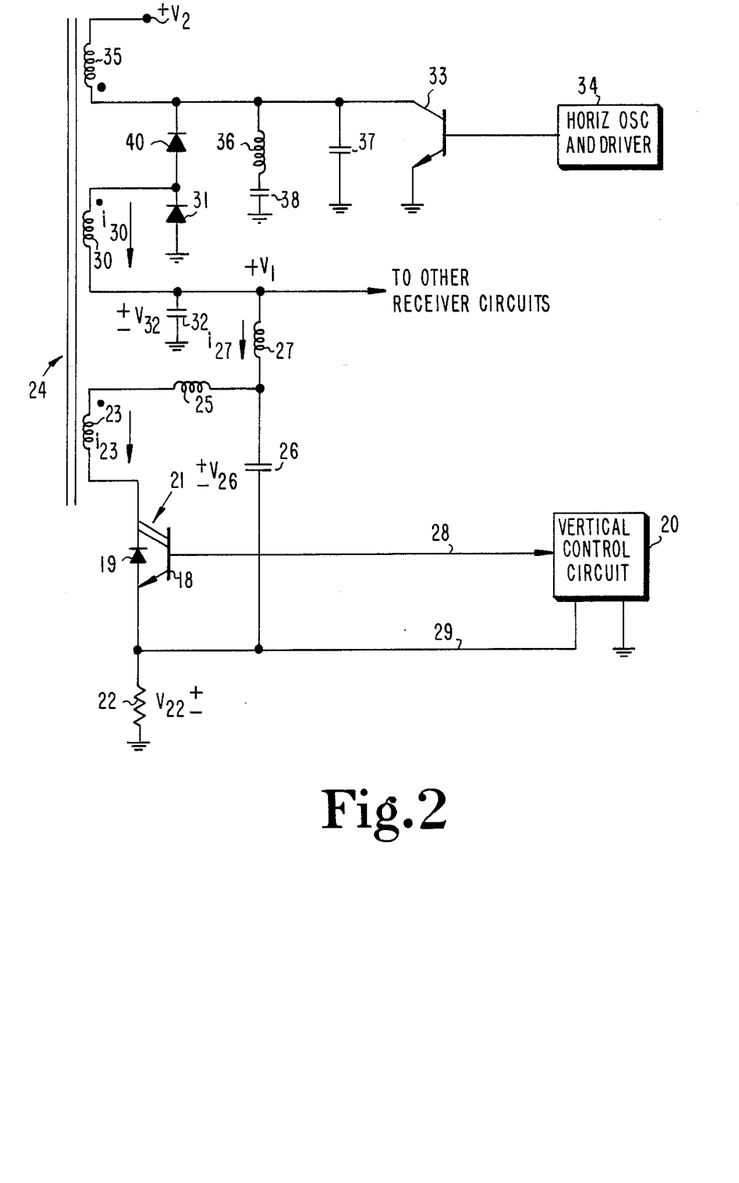
FIG. 2 is a schematic and block diagram of a switched vertical deflection circuit in accordance with an aspect of the present invention.

FIG. 2 illustrates a power supply and vertical or field deflection circuit in accordance with an aspect of the present invention. A vertical control circuit 20 provides width modulated horizontal or line rate switching signals to a switching element 21, illustratively shown as comprising a Darlington transistor 18 and an integrated antiparallel diode 19. Transistor 18 may comprise a power field effect transistor which is advantageous when multiple horizontal rate deflection circuits are provided, such as are used with computer monitor or video display terminals. Switching element 21 is coupled via a winding 23 of high voltage transformer 24 and storage coil 25 to a capacitor 26. Capacitor 26 is coupled to one terminal of a vertical deflection winding 27. The other terminal of vertical deflection winding 27 is coupled to a voltage supply designated $+V_1$. The $+V_1$ supply is generated via a winding 30 of transformer 24, rectifying diode 31 and filter capacitor 32. The $+V_1$ supply may also be used to power other receiver circuits.

A horizontal output transistor 33 is switched at the horizontal deflection rate by signals applied to its base from horizontal oscillator and driver circuits 34. The collector of transistor 33 is coupled to a voltage supply designated $+V_2$ via a winding 35 of transformer 24. Transistor 33 is also coupled to a horizontal deflection winding 36, an S-shaping capacitor 38, and a resonant retrace capacitor 37. A diode 40 is coupled in series with diode 31 between winding 30 and the collector of transistor 33.

Figure 3:
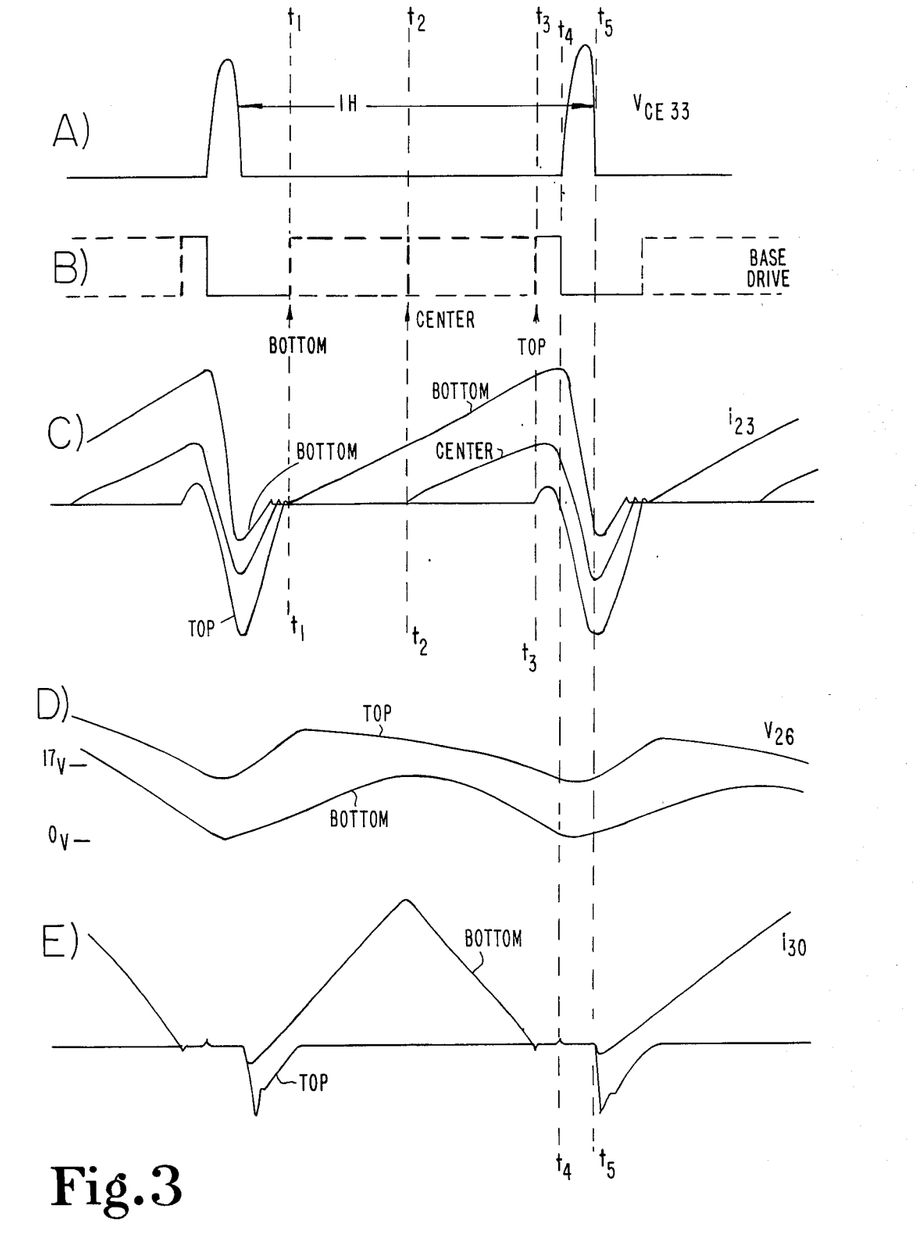
FIGS. 3 and 4 illustrate waveforms associated with the circuit of FIG. 2.

During the horizontal retrace interval, transistor 33 is cut off by horizontal oscillator and driver circuit 34, causing a resonant retrace pulse to be formed across winding 35, as shown in FIG. 3A. This in turn causes a similar pulse to be formed across windings 30 and 23. With transistor 18 of switching element 21 turned off by vertical control circuit 20, a horizontal rate current will circulate from winding 23 through energy storage coil 25, capacitor 26 and diode 19 back to winding 23. As a result, capacitor 26 charges to a level greater than the $+V_1$ level, causing a negative deflection current component of $i_{27}$ to flow through winding 27 and resistor 22. When transistor 18 is rendered conductive by signals from vertical control circuit 20, shown in FIG. 3B, a horizontal rate current component circulates from winding 23 through transistor 18, capacitor 26 and energy storage coil 25. As a result, a positive current component of $i_{27}$ flows from the $+V_1$ source through winding 27 and resistor 22 to ground. The deflection current $i_{27}$ is shown in FIG. 3C. The current through winding 23 and switching element 21 is shown in FIG. 3C at the horizontal deflection rate and in FIG. 4A at the vertical deflection rate. The positive current represents current flow through transistor 18, while the negative current represents current flow through diode 19.

Conductor 28, carrying drive signals for transistor 18, and feedback conductor 29 are of high impedance, as is deflection winding 27, so that horizontal rate current circulates only through winding 23, coil 25, capacitor 26 and switching element 21. Deflection winding 27 represents too high an impedance for horizontal rate currents. The horizontal rate current loop is controlled by vertical control circuit 20 and forms a variable voltage battery having terminals across capacitor 26. The horizontal rate voltage across capacitor 26 is such that the desired vertical deflection current $i_{27}$ passes through capacitor 32, deflection winding 27, the circulating horizontal rate current loop and sampling resistor 22. The horizontal rate components are integrated by the large inductance of winding 27. It can be further seen that the current through resistor 22 is equal to the deflection current $i_{27}$. The voltage developed across resistor 22 is proportional to $i_{27}$, the vertical deflection current.

Figure 4:
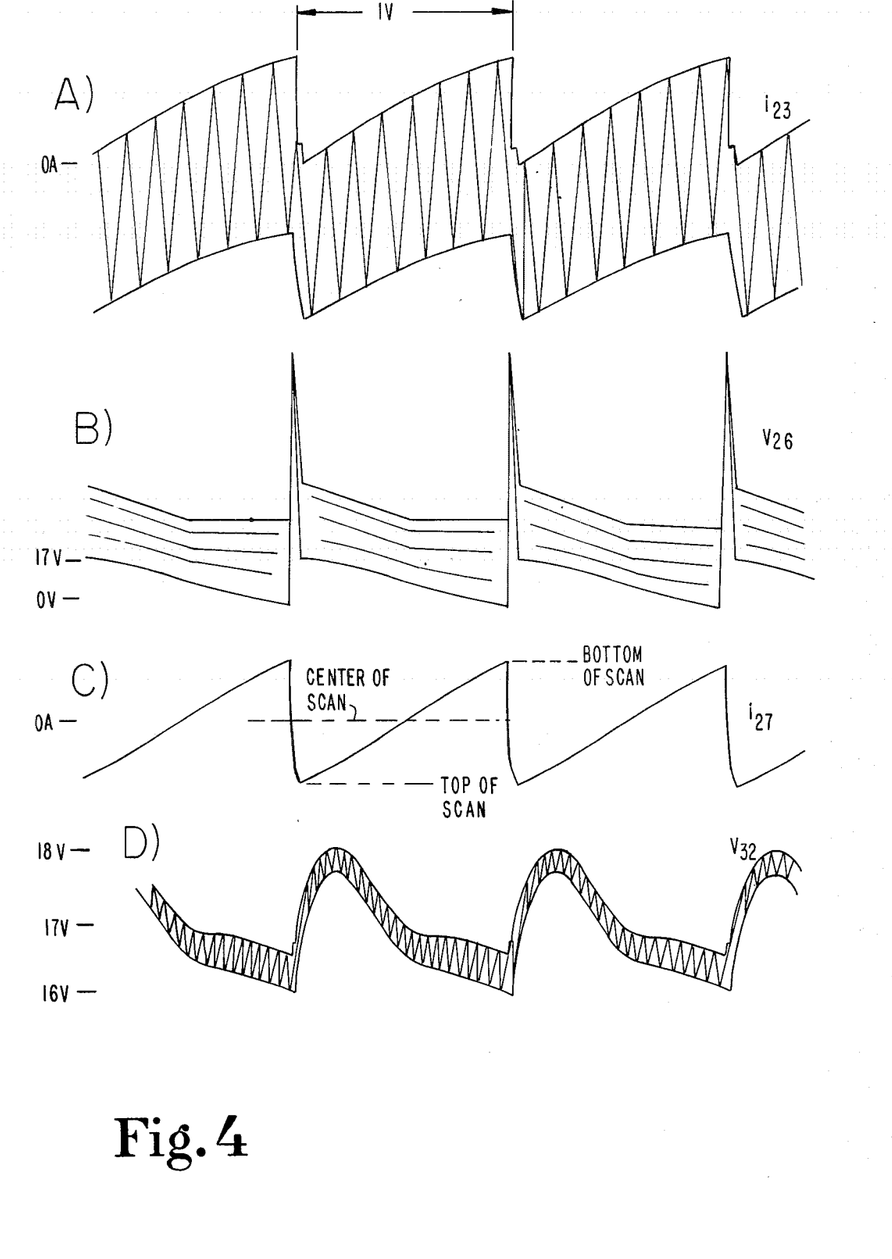

FIGS. 3A, 3B and 3C illustrate the dynamic operation of the circuit. The switching of Darlington transistor 18 is controlled by width modulated base drive current pulses shown in FIG. 3B. The turn-on time is modulated between times $t_1$ and $t_3$. The turn-off time is common at time $t_4$, the end of the horizontal trace interval. Turn-off of transistor 18 is not only provided by the base drive signal but also by the inverting retrace voltage across winding 23. At the beginning of the vertical trace interval at the top of the screen, transistor 18 is rendered conductive between times $t_3$ and $t_4$. The positive portion of current $i_{23}$ is much smaller than the negative one resulting in a positive voltage across capacitor 26, as shown in FIG. 3D and in a negative deflection current $i_{27}$, as shown in FIG. 4C. Vertical control circuit 20 advances the turn-on time of transistor 18. At time $t_2$, the center of the vertical trace interval, the positive and negative portions of $i_{23}$ are equal, the voltage across capacitor 26 equals $+V_1$, and the deflection current $i_{27}$ is zero. A further advance of the turn-on time of transistor 18 toward $t_1$, near the bottom of the screen, results in increasing positive portions and decreasing negative portions of current $i_{23}$. The voltage across capacitor 26 decreases and deflection current $i_{27}$ increases in a positive direction. During the vertical retrace interval, transistor 18 is cut off. Deflection winding 27 and capacitor 26 resonate for one half cycle via resistor 22 and capacitor 32. This produces a large vertical retrace voltage pulse, as shown in FIG. 4B, and reverses the deflection current $i_{27}$. At the beginning of the vertical trace interval, the voltage across capacitor 26 and the deflection current $i_{27}$ are of the proper magnitude and polarity and must only be maintained by current $i_{23}$. The amplitude of the positive current component of $i_{23}$ through transistor 18 also modulates the negative current component of $i_{23}$ through diode 19. This occurs because the di/dt of current $i_{23}$ during the interval $t_4 - t_5$ is determined by the storage coil 25. Therefore, a high transistor current causes a low diode current (bottom) and conversely a low transistor current permits a high diode current (top).

At the beginning of the vertical trace interval, transistor 18 is conductive for only a short period of time, so that the voltage across capacitor 26, shown at the horizontal deflection rate in FIG. 3D and at the vertical deflection rate in FIG. 4B, will be of such a polarity that deflection current, shown in FIG. 4C, flows from capacitor 26 through deflection winding 27 in the $+V_1$ supply. The vertical rate current path is completed through capacitor 32. The additional charge on capacitor 32 from deflection current $i_{27}$ is fed back to the high voltage transformer 24 via winding 30 and diode 40. Diode 40 is rendered conductive by horizontal output transistor 33. Diodes 31 and 40 act also as damper diodes for the horizontal deflection output circuit. The presence of diode 40 therefore allows the $+V_1$ supply to sink current, thereby eliminating the need for a protection circuit as shown in the prior art arrangement illustrated in FIG. 1. The level of the $+V_1$ supply is clamped bidirectionally by diodes 40 and 31 to the horizontal trace voltage across winding 30, thereby stabilizing the $+V_1$ supply. This arrangement also reduces the amount of voltage ripple that appears across capacitor 32, as shown in FIG. 4D. The current flow in winding 30 is shown at the horizontal and vertical deflection rates in FIGS. 3E and 4E, respectively. The positive current represents current flow in diode 31 while the negative current represents current flow in diode 40. The unequal current amplitudes occur because of other load circuits coupled to the $+V_1$ supply. The presence of these load circuits increases current through diode 31 and decreases current through diode 40.

As previously described and as shown in FIG. 3B, at the beginning of the vertical trace interval transistor 18 is conductive for only a short time. This results in capacitor 26 being charged above the level of the $+V_1$ supply, as shown in FIG. 4B, causing deflection current to flow from capacitor 26 through vertical deflection winding 27 to the $+V_1$ supply. During the vertical trace interval, vertical control circuit 20 progressively advances the conduction of transistor 18 each horizontal trace interval, as shown in FIG. 3B, so that transistor 18 conducts for a progressively greater length of time. This causes the net charge on capacitor 26 to progressively decrease through the vertical trace interval, thereby resulting in the desired vertical deflection current through winding 27, as shown in FIG. 4C.

The voltage developed across deflection current sampling resistor 22, as shown in FIG. 4F, is produced by deflection current $i_{27}$ and provides feedback to vertical control circuit 20. This feedback provides information to vertical control circuit 20 to enable the driving of transistor 18 into conduction at the appropriate time each horizontal interval to generate the desired vertical deflection current. The feedback resistor 22 is referenced to ground potential so that supply loading variations by other receiver circuits will not adversely affect the feedback voltage. A common mode rejection circuit in vertical control circuit 20 is therefore not required. This reduces the cost and simplifies the construction of vertical control circuit 20.

Figure 5:
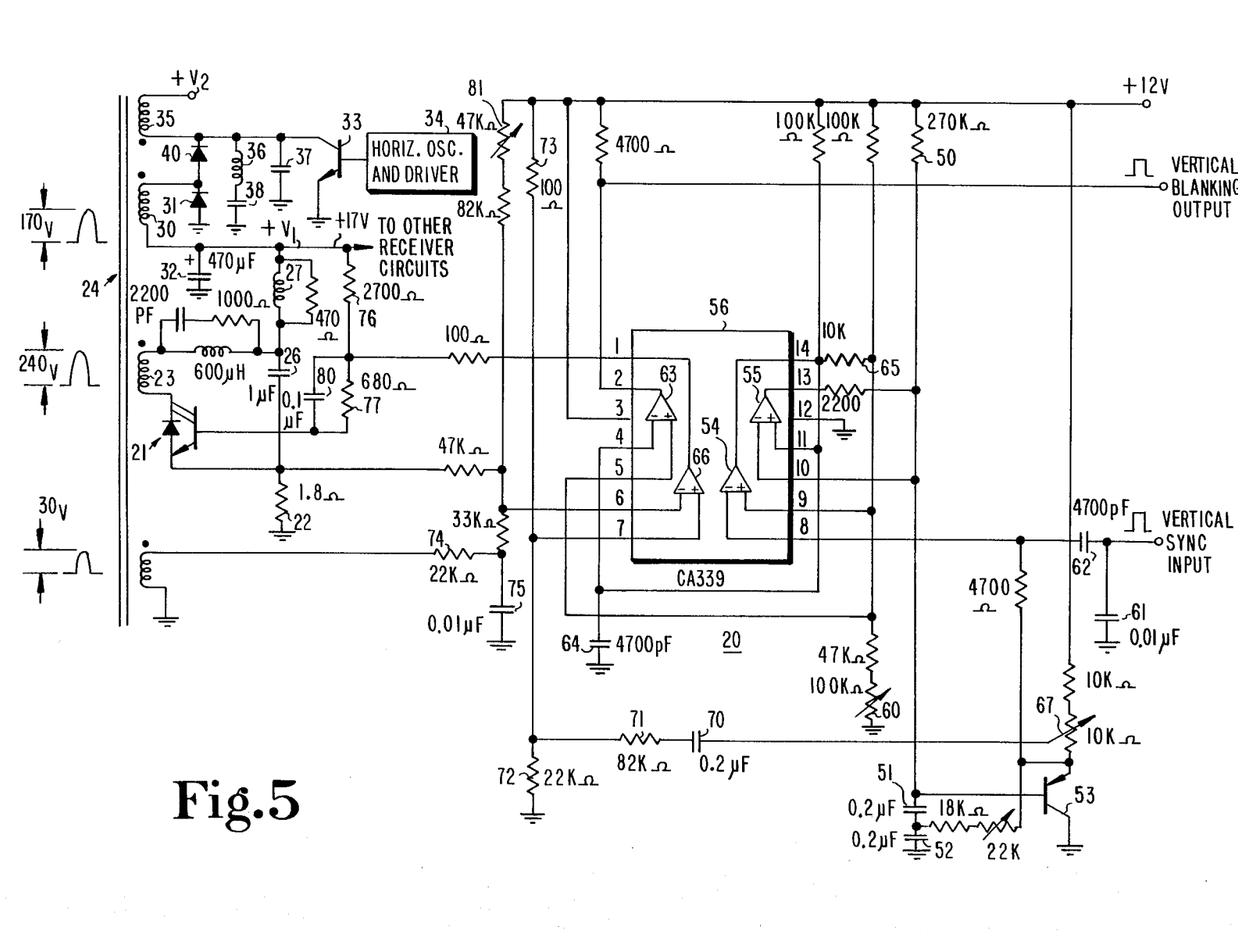
FIG. 5 is a schematic diagram of a practical embodiment of the switched vertical deflection circuit of the present invention.

FIG. 5 illustrates a particular embodiment of a power supply and switched vertical deflection circuit in accordance with the present invention, illustratively for use with a kinescope having a 110° deflection angle. Components corresponding to those in FIG. 2 are designated with the same reference numerals. Representative component values are also given. A CA339 quad comparator is used as the basis for the vertical control circuit, which operates in the following manner. Resistor 50, along with capacitors 51 and 52, and emitter follower transistor 53 form a conventional vertical sawtooth generator. Comparators 54 and 55, incorporated within integrated circuit 56, combine with the sawtooth generator to form a vertical rate oscillator. During the vertical trace interval, capacitors 51 and 52 are charged positively via resistor 50 until the emitter voltage of transistor 53 applied to pin 8 of integrated circuit 56 reaches the voltage present at pin 9. When this occurs, comparator 54 switches low and causes the voltage levels at pin 9 and pin 11 to go low. Comparator 55 then switches low and discharges capacitors 51 and 52 to the low voltage level at pin 9. The output collectors of comparators 54 and 55 then open and a new charge (trace) cycle begins. Hold control resistor 60 determines the high voltage level at pin 9 and therefore determines the length of the charge cycle. Vertical sync pulses are integrated by capacitor 61 and differentiated by capacitor 62. The positive transient of the processed vertical sync pulse sits on the vertical ramp and switches comparators 54 and 55 prior to switching by the emitter voltage of transistor 53.

Comparator 63 serves as a vertical blanking pulse generator. During the vertical trace interval the voltage across capacitor 64 at pin 4 is higher than the voltage at pin 5 because of the voltage drop across resistor 65. Switching of comparator 54 discharges capacitor 64, causing comparator 63 to open. Comparator 63 remains open until capacitor 64 becomes charged to a voltage level higher than the voltage at pin 5. Blanking time is adjustable by varying the value of capacitor 64. Comparator 66 serves as a pulse width modulator. The vertical sawtooth ramp is fed via the height control resistor 67, coupling capacitor 70 and resistor 71 to pin 7 of comparator 66. Resistors 72 and 73 determine the dc bias on pin 7. Resistor 71 determines the amplitude of the vertical ramp voltage applied to pin 7. Capacitor 70 provides the deflection current S-shaping at the beginning of vertical trace.

Horizontal retrace pulses via resistor 74 charge capacitor 75 to obtain a horizontal ramp which is compared with the vertical sawtooth. The output of comparator 66 at pin 1 short circuits to ground the voltage at the junctions of resistors 76 and 77 to provide base drive to transistor 21. Capacitor 80 is required to switch the base voltage below ground because the emitter of transistor 21 is floating on the sampling resistor 22 and swings between ±1 volt. Centering control resistor 81 adjusts the dc bias on pin 6. Illustratively, vertical deflection winding 27 has an inductance of 25 mH, and a resistance of 9.5 ohms.

The previously described switched vertical deflection circuit is desirably utilized at vertical deflection rates of 100 Hz or greater, such as could be provided by progressive scan systems or in digital deflection circuits.

I claim:

1. A field deflection circuit for a video display apparatus, comprising:
   a source of voltage;
   a field deflection winding coupled to said source of voltage;
   energy storage means coupled to said field deflection winding for providing field deflection current in said field deflection winding;
   a source of line deflection rate energy incorporating a switching transistor;
   means for applying a predetermined amount of said line deflection rate energy from said line deflection rate energy source to said energy storage means during a first portion of each line deflection interval and for removing a predetermined amount of energy from said energy storage means during a second portion of each line deflection interval; and
   unidirectional current control means for completing a current path from said field deflection winding to a source of reference potential during a portion of a field deflection interval in response to switching of said transistor, said current path including said switching transistor.

2. The arrangement defined in claim 1 wherein said means for applying and removing line rate energy comprises a field effect transistor and an antiparallel diode.

3. The arrangement defined in claim 1, wherein said unidirectional current control means comprises a diode.

4. The arrangement defined in claim 1, wherein said source of voltage comprises a transformer winding and a capacitor and wherein said source of line deflection rate energy comprises a diode for providing damper action for said source of line deflection rate energy.

5. A field deflection circuit for a video display apparatus, comprising:
   a source of direct voltage;
   a field deflection winding coupled to said source of direct voltage;
   energy storage means coupled to said field deflection winding for providing field deflection current in said field deflection winding;
   a source of line deflection rate energy;
   means for applying a predetermined amount of said line deflection rate energy from said line deflection rate energy source to said energy storage means during a first portion of each line deflection interval and for removing a predetermined amount of energy from said energy storage means during a second portion of each line deflection interval; and first and second unidirectional current control means coupled to said source of direct voltage for clamping the level of said direct voltage within a predetermined range independent of said field deflection current.

6. A field deflection circuit for a video display apparatus, comprising:

a source of voltage;

a field deflection winding coupled to said source of voltage;

energy storage means coupled to said field deflection winding for providing field deflection current in said field deflection winding;

a source of line deflection rate energy;

means for applying a predetermined amount of said line deflection rate energy from said line deflection rate energy source to said energy storage means during a first portion of each line deflection interval and for removing a predetermined amount of energy from said energy storage means during a second portion of each line deflection interval; and first unidirectional current control means for completing a current path from said source of voltage to said field deflection winding for supplying current to said field deflection winding and second unidirectional current control means for completing a current path from said field deflection winding to said source of voltage for sinking current from said field deflection winding.

7. A field deflection circuit for a video display apparatus, comprising:

a source of direct voltage;

a capacitor;

a field deflection winding coupled to said source of direct voltage and to said capacitor;

energy storage means coupled to said field deflection winding for providing field deflection current in said field deflection winding, said deflection current generating an ac ripple component on said capacitor;

a source of line deflection rate energy;

means for applying a predetermined amount of said line deflection rate energy from said line deflection rate energy source to said energy storage means during a first portion of each line deflection interval and for removing a predetermined amount of energy from said energy storage means during a second portion of each line deflection interval; and unidirectional current control means coupled to said source of direct voltage for reducing the magnitude of said ac ripple component.

* * * * *